United States Patent
Wensel et al.

(10) Patent No.: US 8,894,901 B2
(45) Date of Patent: Nov. 25, 2014

(54) METHOD OF MAKING A SHEET OF BUILDING MATERIAL

(75) Inventors: Geoffrey F. Wensel, Vancouver (CA); Robert W. Suggitt, Burnaby (CA)

(73) Assignee: G.R. Green Building Products Inc., Burnaby (CA)

( * ) Notice: Subject to any disclaimer, the term of this patent is extended or adjusted under 35 U.S.C. 154(b) by 725 days.

(21) Appl. No.: 12/679,889

(22) PCT Filed: Oct. 1, 2007

(86) PCT No.: PCT/CA2007/001737
§ 371 (c)(1),
(2), (4) Date: Mar. 24, 2010

(87) PCT Pub. No.: WO2009/043133
PCT Pub. Date: Apr. 9, 2009

(65) Prior Publication Data
US 2010/0215946 A1    Aug. 26, 2010

(51) Int. Cl.
| | | |
|---|---|---|
| B29C 47/00 | (2006.01) | |
| B29C 47/88 | (2006.01) | |
| B29C 55/02 | (2006.01) | |
| E04D 5/06 | (2006.01) | |
| C08L 23/06 | (2006.01) | |
| C08J 5/18 | (2006.01) | |
| C08L 23/08 | (2006.01) | |
| B29C 43/00 | (2006.01) | |
| B29K 105/26 | (2006.01) | |
| B29C 43/24 | (2006.01) | |
| B29L 31/10 | (2006.01) | |

(52) U.S. Cl.
CPC ............ *E04D 5/06* (2013.01); *C08J 2323/06* (2013.01); *B29K 2105/26* (2013.01); *B29C 43/24* (2013.01); *B29L 2031/108* (2013.01); *C08L 23/06* (2013.01); *B29L 2031/10* (2013.01); *C08J 5/18* (2013.01); *C08L 23/0815* (2013.01); *B29C 43/003* (2013.01)
USPC .............. 264/210.6; 264/173.1; 264/175; 264/211; 264/288.4; 264/291; 428/324; 428/330; 428/331

(58) Field of Classification Search
None
See application file for complete search history.

(56) References Cited

U.S. PATENT DOCUMENTS

| | | | |
|---|---|---|---|
| 2,124,384 A | 7/1938 | Ellis | |
| 2,308,589 A * | 1/1943 | Davis | 118/46 |
| 3,070,557 A * | 12/1962 | Gessler et al. | 524/567 |
| 3,133,848 A | 5/1964 | Proctor et al. | |
| 3,272,772 A | 9/1966 | Russell | |
| 3,775,231 A * | 11/1973 | Thomas | 428/110 |
| 3,868,300 A * | 2/1975 | Wheeler | 162/124 |
| 3,969,313 A | 7/1976 | Aishima et al. | |
| 3,976,612 A | 8/1976 | Kaji et al. | |
| 4,104,289 A | 8/1978 | Jones | |
| 4,124,562 A | 11/1978 | Yui et al. | |
| 4,148,780 A | 4/1979 | Blüemel et al. | |
| 4,263,186 A | 4/1981 | Blüemel | |
| 4,461,875 A | 7/1984 | Crepeau | |
| 4,717,496 A | 1/1988 | Brehmer et al. | |
| 5,169,712 A | 12/1992 | Tapp | |
| 5,242,970 A | 9/1993 | Davis et al. | |
| 5,385,972 A | 1/1995 | Yamamoto et al. | |
| 5,468,550 A | 11/1995 | Davis et al. | |
| 5,512,118 A | 4/1996 | Davis et al. | |
| 5,516,829 A | 5/1996 | Davis et al. | |
| 5,582,890 A | 12/1996 | Davis et al. | |
| 5,603,758 A * | 2/1997 | Schreifels et al. | 106/677 |
| 5,700,538 A | 12/1997 | Davis et al. | |
| 5,759,680 A * | 6/1998 | Brooks et al. | 428/326 |
| 5,827,916 A | 10/1998 | McKay et al. | |
| 5,830,548 A | 11/1998 | Andersen | |
| 5,854,327 A | 12/1998 | Davis et al. | |
| 5,865,926 A * | 2/1999 | Wu et al. | 156/229 |
| 5,973,049 A | 10/1999 | Bieser | |
| 6,165,619 A * | 12/2000 | Ikenaga et al. | 428/448 |
| 6,262,161 B1 | 7/2001 | Betso et al. | |
| 6,264,864 B1 * | 7/2001 | Mackay | 264/154 |
| 6,290,885 B1 * | 9/2001 | Roetheli et al. | 264/108 |
| 6,310,129 B1 | 10/2001 | Lilly et al. | |
| 6,506,695 B2 | 1/2003 | Gardner et al. | |
| 6,530,189 B2 | 3/2003 | Freshwater et al. | |

(Continued)

FOREIGN PATENT DOCUMENTS

| | | |
|---|---|---|
| CA | 2284959 | 4/2000 |
| GB | 1409508 | 10/1975 |
| GB | 1534128 | 11/1978 |

*Primary Examiner* — Jeffrey Wollschlager
(74) *Attorney, Agent, or Firm* — Oyen Wiggs Green & Mutala LLP

(57) ABSTRACT

A method of making a sheet of building material, useful for roofing or siding applications, and the sheet material made by such method. A mixture of a thermoplastic resin and mineral filler is prepared, the resin comprising about 10% to 40% by weight of the mixture and the filler comprising about 60% to 90% by weight. The mixture is mixed at a temperature above the melting point of the resin and is formed into a sheet at such temperature. The sheet is allowed to cool until the surface is at a temperature below the midpoint of the melting range of the thermoplastic resin, e.g. in the range of 210 to 220 degrees F. (99 to 104 degrees C.), for polyethylene, at which point it is strained by passing it through calendering rollers. The sheet material made by this process, having a high concentration of mineral filler, is fire resistant, durable, ductile, of moderate weight and resistant to weathering. It can be produced using relatively inexpensive manufacturing equipment. The sheet material can incorporate a high proportion of recycled resin, such as recycled high density polyethylene.

20 Claims, 4 Drawing Sheets

(56) References Cited

U.S. PATENT DOCUMENTS

| | | |
|---|---|---|
| 6,534,150 B1 * | 3/2003 | Yamanaka et al. ............ 428/143 |
| 6,632,509 B1 | 10/2003 | Davis et al. |
| 6,843,949 B2 * | 1/2005 | Brady et al. ............... 264/210.2 |
| 6,935,089 B2 * | 8/2005 | Jolitz et al. ...................... 53/447 |
| 5,571,868 A1 | 11/2006 | Datta et al. |
| 7,438,017 B2 * | 10/2008 | Jabbari et al. ................... 118/44 |
| 7,972,981 B2 * | 7/2011 | Anderson et al. ............... 442/77 |
| 2003/0055175 A1 * | 3/2003 | Klosiewicz .................. 525/240 |
| 2003/0198813 A1 * | 10/2003 | Howell ..................... 428/411.1 |
| 2004/0016502 A1 * | 1/2004 | Jones ............................ 156/229 |
| 2004/0023585 A1 * | 2/2004 | Carroll et al. ................. 442/381 |
| 2005/0032959 A1 | 2/2005 | Cheung et al. |
| 2005/0086907 A1 * | 4/2005 | Jolitz .......................... 52/782.1 |
| 2005/0140041 A1 | 6/2005 | Seth |
| 2005/0146069 A1 * | 7/2005 | Kanan ............................ 264/76 |
| 2006/0035139 A1 * | 2/2006 | Kumakura et al. ........... 429/124 |
| 2007/0135548 A1 | 6/2007 | Seth |
| 2007/0138700 A1 * | 6/2007 | Oshilaja et al. .............. 264/319 |
| 2007/0296112 A1 * | 12/2007 | Brandt et al. ................. 264/175 |
| 2008/0308240 A1 * | 12/2008 | Biagiotti ....................... 162/117 |
| 2009/0042471 A1 * | 2/2009 | Cashin et al. ................. 442/182 |

* cited by examiner

000
METHOD OF MAKING A SHEET OF BUILDING MATERIAL

FIELD OF THE INVENTION

The invention pertains to building materials in sheet form for applications such as roofing and siding. More particularly, it pertains to sheet materials comprising thermoplastic resin and mineral filler and to methods of making such materials.

BACKGROUND OF THE INVENTION

Many types of natural and synthetic roofing materials are available in the market. Some of the more popular natural types include natural slate, shakes and shingles. Natural slate has long been a popular roofing material due to its attractive appearance and durability and also because it possesses other highly desirable properties such as being fireproof and waterproof. It is, however, very expensive and as a result is normally used for roofing in only the most expensive houses and in other structures where the increased cost can be justified. Slate is a brittle material and can be cracked or broken rather easily. Natural slate tiles are quite durable; however they require a substantial amount of labor in their installation and can break on impact. They are inherently fragile and suffer much breakage during shipping and installation. They are fragile even after installation on the roof and can be damaged by foot traffic on the roof. Slate tiles tend to be excessively heavy and dangerous in earthquakes and high winds, and will fall through the roof in the event of a fire. Since the tiles are so heavy, they are also expensive to ship. Also, due to the weight of natural slate, extra structural support is required for slate roofs compared to cedar shake or shingle roofs or asphalt roofs.

Wood shakes and shingles are subject to breakage, rot and loss of coloration. Their cost is relatively high and they are labor-intensive to install. Furthermore, wood shakes and shingles can be relatively heavy and are flammable, porous and cannot withstand relatively high wind velocity. A disadvantage of wooden shakes and shingles is that they absorb moisture and swell. Therefore, they must be applied in a spaced-apart arrangement to allow room for moisture expansion. Because of the propensity of wooden shakes and shingles to absorb water, with time they tend to curl and not remain flat on the roof.

Synthetic roofing materials provide some advantages over these natural materials. They are moldable and light in weight. However, they have not, in general, been fully acceptable in terms of performance because they often do not meet all the requirements desired for roofing applications. As an example, synthetic roofing materials typically have high concentrations of plastic or rubber content in the formulation that directly effects the fire resistance of the products because plastic and rubber materials lack fire resistant properties. In some case, fire resistance of the product has been enhanced by adding a high concentration of flame retardant, which in turn, makes the product much more expensive. Products with recycled rubber may also have a strong odor on warm days due to the gassing off of volatile components.

One desirable property of any synthetic roofing material is to be able to resist fires. This is particularly true in regions having a hot and dry climate, although fire resistance is desirable everywhere. A particularly important aspect of fire resistance is the ability of the roofing material to prevent the spread of fire from a source of heat, such as a burning ember, from burning through the roof to thereby expose the roof deck or interior of the building to a fire.

Another desirable property of any roofing material is that it has long-term ductility, enabling installers and owners to walk on the roof at any time during the roofing product's lifespan, without causing damage. Ductility in roofing materials also allows repairs to be more easily undertaken in the event of damage, such as that incurred from falling tree limbs.

Additionally, with public awareness increasing about the importance of recycling to consume fewer materials, it is desirable that recycled materials be used as a portion of any synthetic roofing materials. This provides a market for recycled materials, and recycling practices are encouraged if there is a known commercial application for these materials.

There have been various attempts to meet the requirements of synthetic building materials by means of molded products made from plastic resins and inorganic fillers. The following patent documents are examples.

U.S. Pat. No. 5,571,868 (Datta et al.) discloses elastomeric polymer compositions used in sheet materials for roofing. The materials can comprise elastomeric polymers and inorganic fillers, and can be made by heating, roll milling and calendering the mixture.

U.S. Pat. No. 3,070,577 (Gessler et al.) discloses polymeric composites containing inorganic fillers. The mixture may be formed into thin sheets, useful for roofing, by heating it and passing it through rollers.

U.S. Pat. No. 4,263,186 (Bluemel) discloses a thermoplastic composite made by mixing polyethylene and calcium carbonate. It may be formed into a sheet on a rolling mill and the resulting material used in building construction.

US 2005/0140041 A1 (Seth) discloses a synthetic building material made by extruding a mixture of plastic resin, which may be recycled polyethylene, and a filler, which may be limestone.

U.S. Pat. No. 3,976,612 (Kaji et al.) discloses a method of making a composite sheet by mixing an inorganic calcium compound with polyethyelene, kneading and heating the mixture into a paste and calendering it into a film.

GB 1 534 128, published Nov. 29, 1978, discloses a method of making a composite sheet comprising polymer resins and calcium carbonate by heating the composition, rolling it into a rough film at a temperature of 160 to 180 degrees C. through a roller nip of 2-5 mm and rolling the rough film into a smooth film at a temperature of 160 to 180 degrees C. through a roller nip of 0.1 to 1 mm.

However, there remains a need in the building industry for a synthetic sheet material which has the characteristics that are important for use in roofing and siding applications. It would be desirable to have a synthetic material that could overcome the disadvantages of the previous attempts to produce such materials. There is a need for a synthetic sheet material that is durable, moderate in weight, inexpensive, fire resistant, tough and ductile, that can be made in part by using recycled materials, and that can be produced using relatively inexpensive production equipment.

SUMMARY OF THE INVENTION

The present inventors have discovered that, when a highly mineral-filled thermoplastic composite is strained under controlled temperature conditions, it is possible to reduce the loss of toughness and ductility that is normally associated with the use of high filler ratios, and produce a sheet material having enhanced toughness and ductility.

The invention provides a method of making a sheet of building material, useful for roofing or siding applications, and the sheet material made by such method.

A mixture of a thermoplastic resin and mineral filler is prepared, the resin comprising about 10% to 40% by weight of the mixture and the filler comprising about 60% to 90% by weight. The mixture is mixed at a temperature above the melting range of the resin and is formed into a sheet at such temperature. The sheet is allowed to cool until the surface is at a temperature below the midpoint of the melting range of the resin, at which point it is rolled (calendered), for example by passing it through calendering rollers.

According to one embodiment of the method, the surface of the sheet is allowed to cool to a temperature in the range of 205 to 225 F. (96 to 107 degrees C.) for rolling. In another embodiment the resin is polyethylene and the surface temperature range is 210 to 220 degrees F. (99 to 104 degrees C.) In yet another embodiment, the resin is polypropylene and the surface temperature range is 220 to 250 degrees F. (104 to 121 degrees C.)

The sheet material made by this method, having a high concentration of mineral filler, is fire resistant and is less expensive than products made with a higher proportion of resin. The sheet material is durable, ductile, of moderate weight and resistant to weathering. It can be produced using relatively inexpensive manufacturing equipment. The sheet material can incorporate a high proportion of recycled resin, such as recycled high density polyethylene (HDPE).

In prior art processes for making sheet materials comprising polyethylene and mineral filler, the amount of HDPE, and especially recycled HDPE, that can be incorporated in the product is limited due to the brittleness caused by HDPE. The method of the invention reduces the brittleness of the sheet material and permits the use of higher levels of HDPE, and especially recycled HDPE, than in prior art processes.

These and other advantages and features of the invention will be apparent from the following description of the preferred embodiments.

DETAILED DESCRIPTION OF THE PREFERRED EMBODIMENTS

Figure 1:
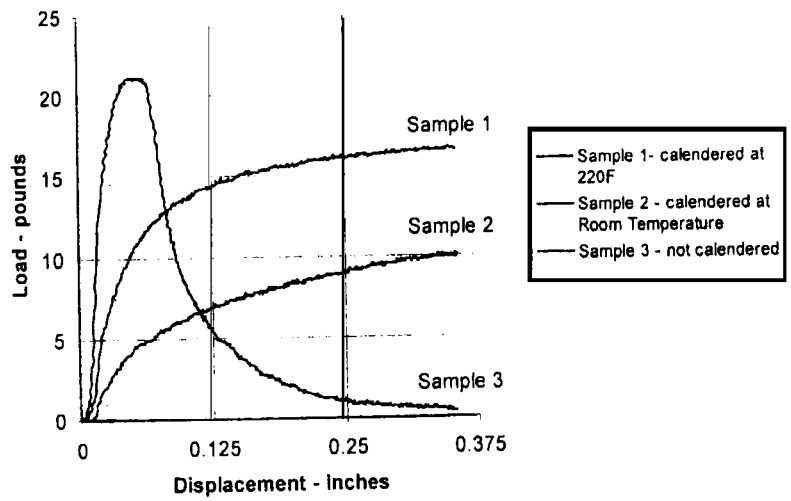
FIG. 1 is a graph showing the effect of straining at 220 degrees F. and at room temperature.

The method of the invention produces a sheet of building material, such as a roofing panel or siding panel, comprising a thermoplastic resin and mineral filler. In this specification, the word "sheet" includes a piece having any thickness that is practical for use in building applications. In the preferred embodiment, the resin is polyethylene and the filler is limestone (calcium carbonate) powder.

The limestone is heated to between 300 and 350 degrees F. (149 and 177 degrees C.) and the polyethylene is added to it, in pellet, flake or powdered form. Additives of the types discussed below are also added. The temperature of the mixture is maintained above the melting range of the polyethylene. It is preferably maintained at about 300 to 325 degrees F. (149 to 163 degrees C.) for polyethylene-limestone formulations. This temperature is maintained while the polyethylene and limestone are mixed. Mixing is done by means of kneading in a twin-blade or twin-screw blender in an open atmosphere. The open atmosphere allows gassing off, i.e. the release of steam formed by moisture in the components, to minimize entrapped gas and reduce the size and number of voids in the finished product.

The kneaded paste is formed into a sheet of the desired width and length. The thickness is about one-quarter inch (6.4 mm), which is suitable for typical roofing and siding applications. The surfaces of the sheet are then allowed to cool to a temperature in the range of 210-220 degrees F. (99-104 degrees C.), at which point the sheet is passed between pressure-controlled calendering rollers which cause a strain in the sheet longitudinally of about 1% to 10%. The calendering rollers simultaneously strain and cool the sheet, producing a finished sheet having the desired physical properties. The calendering force used to effect the desired degree of straining is up to about 15,000 pounds. The calendering rollers are maintained at a temperature below the solidus temperatures of the polymers used in the mixture, for example between room temperature and 150 degrees C. The rollers may be water-cooled to maintain them in this range.

When the surface temperature of the surface of the one-quarter inch thick sheet is in the range of 210-220 degrees F. (99-104 degrees C.) the temperature in the middle of the sheet is in the range of 225-245 degrees F. (107-118 degrees C.). For practical purposes in controlling the process, the surface temperature is easier to measure.

The calendering rollers may be patterned to simultaneously emboss surface textures or features on the sheet during the straining step. Such surface features may include those resembling, for example, natural slate, cedar shingles, cedar siding, wood grain or other artificial texture or pattern.

By varying the force applied by the calendering rollers during the straining step, the colour tone of the final product can be varied to better resemble the variation in colour tones found in natural products such as slate and cedar. The variation in force is created by randomly varying the pressure delivered to the actuators maintaining the calendering force. The actuators are of a type with little or no stiction so that even small pressure changes effect a proportional change in calendering force.

A protective coating such as Varathane (trademark) polyurethanes or other polymeric coating can be applied to the surface of the produced sheet material. This significantly reduces the susceptibility of the sheet material to surface abrasion.

In the resin-filler mixture, the resin may comprise about 10-40% by weight of the mixture, preferably 10-35%, and more preferably about 20%; and the mineral filler may comprise about 60-90%, preferably 65-90%, and more preferably about 80%.

The resin may comprise polyethylene. The polyethylene may comprise a mixture of high density polyethylene and linear low density polyethylene. The ratio of HDPE to LLDPE may be about 3:1 by weight. Any or all of the resin may comprise recycled material and it preferably comprises at least half recycled material. The high density polyethylene may comprise recycled milk bottles. Alternatively, the resin may comprise polypropylene and/or recycled polypropylene.

The mineral filler is preferably limestone. Examples of other mineral fillers that may be used in the invention include dolomite, talc, silica and flyash. The particle size of the mineral filler may be about 100 mesh. Alternatively, a mixture of 100 mesh and 200 mesh may be used, e.g. about 90% of 100 mesh and 10% of 200 mesh, to marginally reduce the susceptibility of the sheet material to surface abrasion. It has been found that limestone of larger particle size, e.g. 30 to 40 mesh or larger, tends to result in a brittle sheet material.

The mixture of resin and mineral may also include additives that are useful for particular applications. Where the sheet is to be used for roofing panels, a stabilizer such as carbon black (about 1-2% by weight relative to the resin) may be added to the mixture to stabilize the finished product against the depolymerizing effect of ultraviolet light and sunlight. UV inhibitors may be included, such as Tinuvin 783 and Tinuvin 328 (trademarks) made by Ciba Specialty Chemicals, and Hostavin N321 and Hostavin ARO 8 (trademarks) made by Clariant. Inorganic pigments may be included, such as chromium oxide green, raw titanium, titanium white, and iron oxide such as raw sienna and burnt sienna. Licocene (trademark), a wax made by Clariant, may be included to enhance ductility.

The mixture may include mica, which has the effect of enhancing the ductility of the sheet material and the effect of pigments. The mixture may comprise about 0.1 to 1% by weight mica.

The sheet material of the invention is relatively fire resistant and fireproof. If increased fire resistance is desired, a fireproofing additive may be included in the resin-filler mixture. Examples include highly chlorinated naphthalenes, phosphates, organic fluorides, siloxanes and silicates.

The mixture may also include a processing stabilizer or lubricant such as a metallic stearate, hydrocarbon, fatty acid, ester, amide, fluoropolymer, silicone or boron nitride.

Example 1

A composition was made comprising about 80% by weight limestone of 100 mesh, 18% by weight polyethylene (13.5% by weight recycled HDPE flakes and 4.5% by weight virgin LLDPE) and 2% by weight of lubricants (zinc stearate or stearic acid). The mixture was made, kneaded and formed into a sheet at about 300-325 degrees F. (149-163 degrees C.). Sample #1 of this preparation was allowed to cool to a surface temperature of about 210-220 degrees F. (99-104 degrees C.) and was strained at that temperature by calendering rollers. Sample #2 of this preparation was allowed to cool to ambient temperature of about 70 degrees F. (21 degrees C.) and was strained at that temperature by calendering rollers. Sample #3 of this preparation was simply allowed to cool to ambient temperature and was not strained.

The samples were tested for brittleness and ductility as follows. Samples of about 4.5 inches (11.4 cm) in length, 1 inch (2.54 cm) in width and 0.25 inches (6.4 mm) in thickness were loaded into a three-point flexural testing apparatus with end supports 4 inches (10.2 cm) apart and with the load applied at the midpoint between the supports. Loads were applied and the resulting displacement was measured, giving results summarized in FIG. 1.

Sample 3 exhibited brittle behaviour and brittle fracture when tested in the three-point flexural testing apparatus. Brittle behaviour is undesirable in roofing applications because simply walking on a brittle roofing material after it has been applied may cause fracture and permanent damage. Additionally, brittle behaviour is not desired and ductile behaviour is preferred when roofing materials are fastened into position with nails. Ductility when nailing reduces the probability of the roofing splitting or developing excessive internal stresses in the immediate vicinity of the nail hole.

Samples 1 and 2 exhibited lower strength but significantly greater ductility than Sample 3. The ductility of Samples 1 and 2 is directly related to the change in physical properties caused by allowing these samples to cool and then straining and cooling the samples. Sample 1 exhibited increased strength compared to Sample 2; consequently Sample 1 is considered the most desirable of the three samples for roofing applications because of its ductility and moderate strength.

Example 2

The effect of having increased levels of limestone in sheet material made from a mixture of polyethylene and limestone was studied. Samples A to D were prepared having the following compositions:

Sample A: 52% limestone, 46% polyethylene (of which three-quarters is recycled HDPE and one-quarter is virgin LLDPE).

Sample B: 60% limestone, 38% polyethylene (of which three-quarters is recycled HDPE and one-quarter is virgin LLDPE).

Sample C: 71% limestone, 27% polyethylene (of which three-quarters is recycled HDPE and one-quarter is virgin LLDPE).

Sample D: 80% limestone, 18% polyethylene (of which three-quarters is recycled HDPE and one-quarter is virgin LLDPE).

Figure 2:
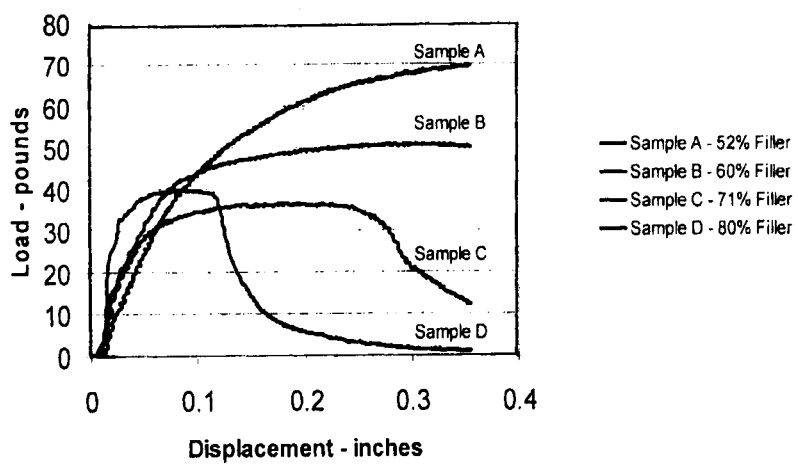
FIG. 2 is a graph showing the effect of increasing levels of filler with recycled HDPE.

Each sample composition was kneaded at about 300-325 degrees F. (149-163 degrees C.) and formed into a sheet. No straining of the sheets, as by calendering, was carried out. The sample sheets (having dimensions the same as in Example 1) were tested for brittleness and ductiblity using a three-point flexural test as described in Example 1. The results are summarized in FIG. 2

Samples C and D fracture at low and moderate deformations while Samples A and B did not fracture for the extent of the test. Samples A and B displayed ductile behaviour that is useful in the construction industry. However, Samples A and B are comparatively expensive to produce because of the high thermoplastic resin and low mineral filler contents.

Example 3

Figure 3:
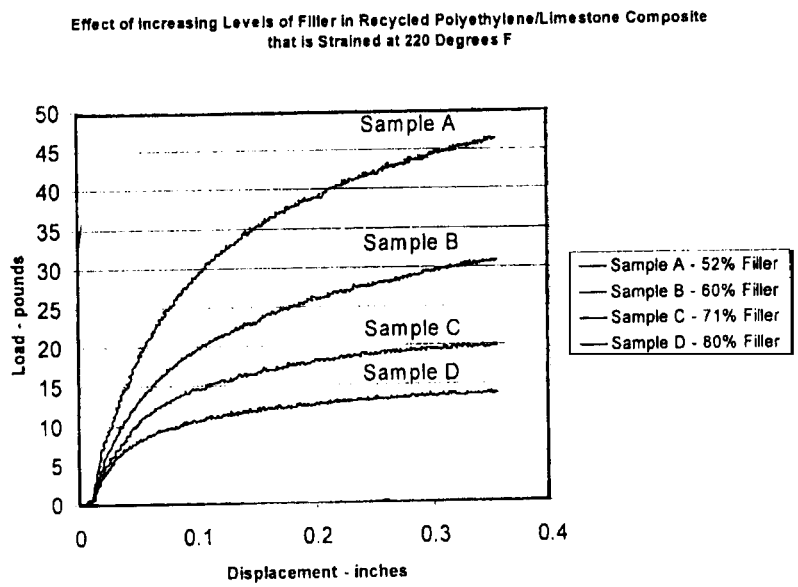
FIG. 3 is a graph showing the effect of increasing levels of filler in recycled polyethylene/limestone composite that is strained at 220 degrees F.

The effect of straining at 220 degrees F. (104 degrees C.) of sheets made with different levels of limestone filler was studied. Samples A to D were prepared having the same compositions as in Example 2. They were made and kneaded about 300-325 degrees F. (149-163 degrees C.) and formed into sheets. They were allowed to cool to a surface temperature of about 220 degrees F. (104 degrees C.) and were strained at that temperature by passing them through calendering rollers. The four samples were tested for brittleness and ductility according to the method described in Example 1. The results are summarized in FIG. 3.

The results show that all samples regardless of the level of mineral filler exhibited ductile behavior.

Example 4

Figure 4:
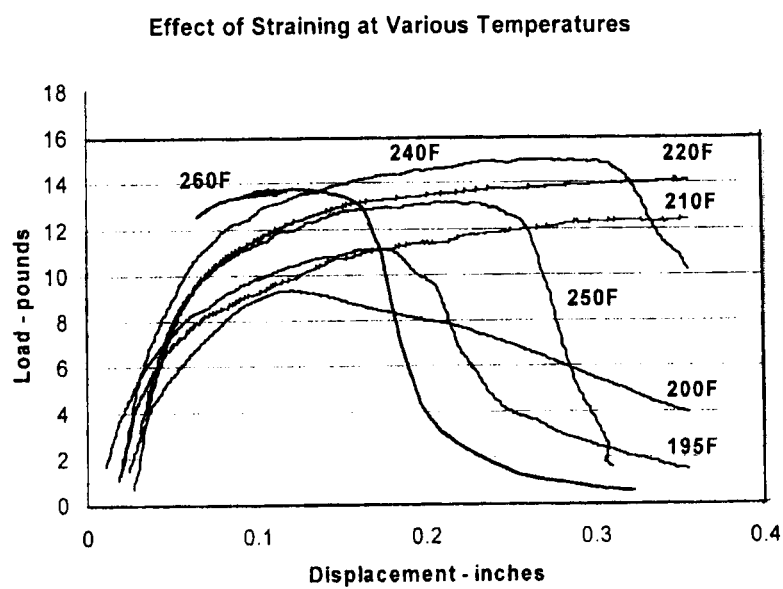
FIG. 4 is a graph showing the effect of straining at various temperatures.

The effect of straining temperatures was studied. Samples were prepared having the composition described in Example 1. They were kneaded and formed into sheets at about 300-325 degrees F. (149-163 degrees C.). They were allowed to cool to respective surface temperatures of 195 degrees F. (91 degrees C.), 200 degrees F. (93 degrees C.), 210 degrees F. (99 degrees C.), 220 degrees F. (104 degrees C.), 240 degrees F. (116 degrees C.), 250 degrees F. (121 degrees C.) and 260 degrees F. (127 degrees C.) and were strained by calendering rollers at those temperatures. The samples were tested for brittleness and ductility using a three-point flexural test as described in Example 1. The results are summarized in FIG. 4.

The results show that the samples strained at surface temperatures of 210 and 220 degrees F. exhibited the highest levels of ductility, and the samples strained at lower or higher surface temperatures exhibited various degrees of brittle behaviour.

Without wishing to be bound by any particular scientific theory for the behaviour demonstrated in this example, it is believed that in the samples where the composite material is strained at surface temperatures of 240, 250 or 260 degrees F., the majority of solidification of the polyethylene occurs after straining, permitting comparatively large internal stresses to develop and resulting in brittle behaviour. In the samples where the composite material is strained at a surface temperature of 190 or 200 degrees F., the majority of solidification of the polyethylene has occurred prior to straining and there is insufficient polyethylene in melted form to permit enough movement within the composite matrix of the limestone and polyethylene to relieve internal stresses by straining. Consequently, these samples also exhibit brittle behaviour. When the surface temperature of a quarter-inch thick sheet of the invention is approximately 220 degrees F. (104 degrees C.), the temperature inside the sheet is approximately 225-245 degrees F.

Example 5

Figure 5:
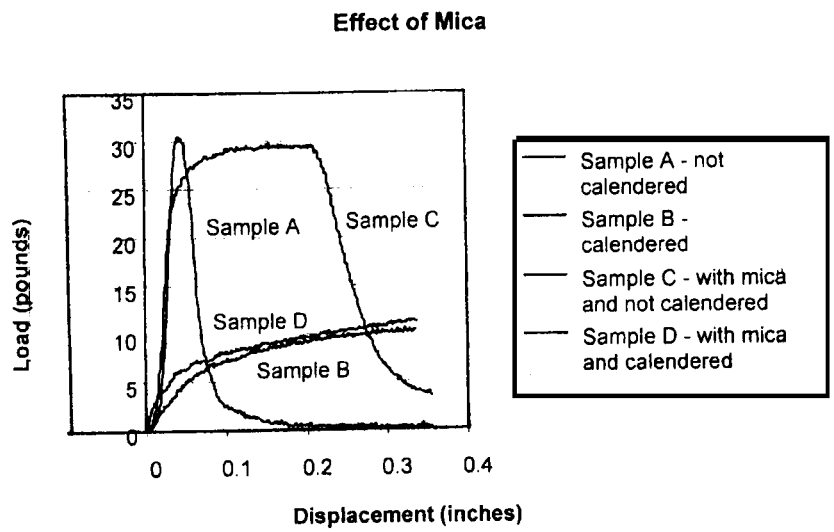
FIG. 5 is a graph showing the effect of mica.

The effect of small concentrations of mica on the ductility of the composite material was studied. Compositions were prepared comprising 78% limestone, 18% polyethylene (13.5% by weight recycled HDPE and 4.5% by weight virgin LLDE) and 2% by weight of lubricants, (zinc stearate or stearic acid), and either with no mica or having 0.2% by weight mica. The compositions were formed into sheets by the method described in Example 1 and were either strained by rolling at 210 degrees F. (99 degrees C.) or were not strained. Sample A had no mica and was not strained. Sample B had no mica and was strained. Sample C had mica and was not strained. Sample D had mica and was strained. The four samples were tested for brittleness and ductility according to the method described in Example 1. The results are summarized in FIG. 5.

Sample A shows brittle behaviour and Sample C somewhat ductile behaviour. While the introduction of mica is seen to improve ductility of a composite that has not been rolled at 210 degrees F., this improvement in ductility is not considered sufficient for building applications. Specifically, this improvement in ductility is not sufficient to permit the nailing of the composite without a high probability of splitting due to its limited ductility. For example, when Samples A and C were nailed approximately one-half inch from an edge, the samples split.

Samples B and D show the ductile behaviour of the composite after it has been rolled at 210 degrees F. While Samples B and D appear on the same graph, when the samples were repeatedly bent back and forth by hand after the flexural test, Sample B (no mica) broke or failed much earlier than Sample D (with mica), indicating the enhanced ductility of Sample D. This improved ductility is of value in applications where enhanced toughness is desired.

Example 6

Figure 6:
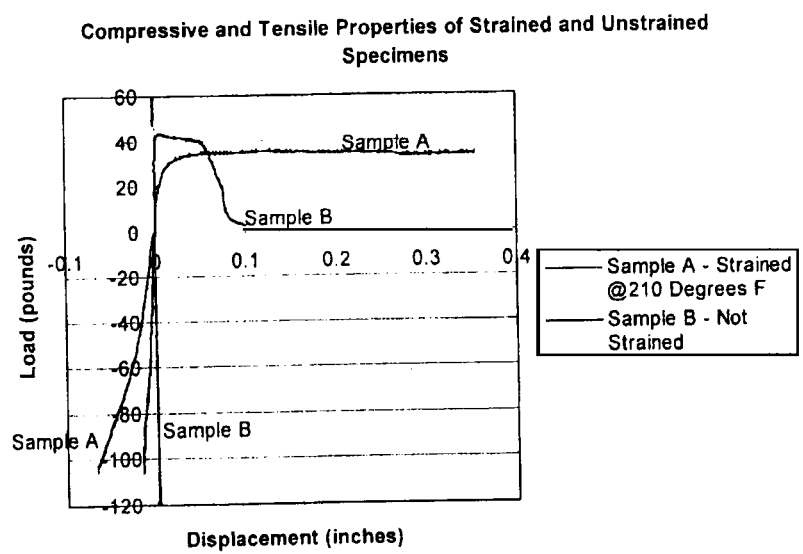
FIG. 6 is a graph showing the effect of compressive and tensile properties of strained and unstrained specimens.

The compressive and tensile properties of strained and unstrained samples were studied. Sheet materials were made as described in Example 1, one sample of which was strained at 210 degrees F. (Sample A) and one of which was not strained (Sample B). The compressive and tensile properties of the samples were tested. The results are summarized in FIG. 6.

To determine the compressive properties, specimens of Sample A and Sample B measuring approximately ¼ inch by ¼ inch were tested. For Sample A specimens, the ½ inch dimension was longitudinal to the direction of strain. The specimens were loaded with a compressive force to approximately 100 pounds along the ½ inch dimension and load and displacement measured and recorded. At 100 pounds load, Sample A exhibited approximately four times more compressive displacement than Sample B as evidenced the negative displacement shown in the lower left quadrant of FIG. 6.

To determine the tensile properties, 4½ inch long dog-bone shaped specimens with the middle section of the specimen approximately ¼ inch by ¼ inch and 2 inches long were tested. For Sample A specimens, the 2 inch dimension was longitudinal to the direction of strain. The specimens were tested with a tensile load applied along the 2 inch dimension and load and displacement measured and recorded. Sample A exhibited ductile behavior and Sample B exhibited brittle behavior as evidenced by the results shown in the upper right quadrant of FIG. 6.

The test results provided further evidence that ductility is increased by straining the composite at approximately 210 degrees F.

Example 7

Figure 7:
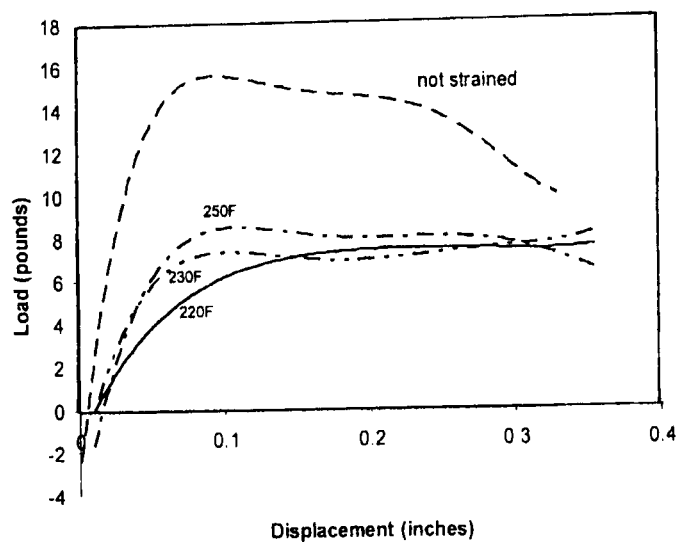
FIG. 7 is a graph showing the effect of straining composite composed with polypropylene resin.

The effect of straining temperatures on sheet materials in which the resin comprises polypropylene were studied. Samples were prepared having a composition comprising about 80% by weight limestone of 100 mesh, 18% by weight polypropylene and 2% by weight of lubricants (zinc stearate or stearic acid). They were kneaded and formed into sheets at about 300-325 degrees F. (149-163 degrees C.). They were allowed to cool to respective surface temperatures of 210 degrees F. (99 degrees C.), 220 degrees F. (104 degrees C.), 230 degrees F. (110 degrees C.), 240 degrees F. (116 degrees C.) and 250 degrees F. (121 degrees C.), and were strained through calendering rollers at those temperatures. One sample was simply allowed to cool to room temperature and was not strained. The samples were tested for brittleness and ductility using a three-point flexural test as described in Example 1. The results are summarized in FIG. 7.

Although the invention has been described in terms of various embodiments, it is not intended that the invention be limited to those embodiments. Various modifications within the scope of the invention will be apparent to those skilled in the art. The scope of the invention is defined by the claims that follow.

What is claimed is:

1. A method of making a sheet of building material for roofing or siding applications, comprising the steps of:
   (a) preparing a mixture comprising a thermoplastic resin and a mineral filler, said resin comprising about 10% to 40% by weight of said mixture and said filler comprising about 60% to 90% by weight of said mixture, said resin comprising one of polyethylene and polypropylene;
   (b) mixing said mixture at a temperature above the melting range of said resin;
   (c) forming said mixture into a sheet, said forming step being done at a temperature above the melting range of said resin;

(d) allowing a surface of said sheet to cool to a temperature below the midpoint of the melting range of said resin, said temperature being in the range of 210 to 220 degrees F. when said resin comprises polyethylene and in the range of 220 to 250 degrees F. when said resin comprises polypropylene; and (e) straining said sheet by calendering, rolling or pressing said sheet when said surface temperature is within said temperature range of step (d) to increase a length of said sheet by 1% to 10%.

2. A method according to claim 1 wherein said polyethylene is a mixture of high density polyethylene and linear low density polyethylene.

3. A method according to claim 2 wherein the weight ratio of said high density polyethylene to said linear low density polyethylene is about 3:1.

4. A method according to claim 1 further comprising lowering said surface temperature during said step of straining.

5. A method according to claim 1 wherein said filler is limestone.

6. A method according to claim 1 wherein said filler is one of dolomite, talc, silica and flyash.

7. A method according to claim 5 wherein said limestone is about 100 mesh in particle size.

8. A method according to claim 1 wherein said thermoplastic resin comprises 10% to 35% by weight of said mixture.

9. A method according to claim 1 wherein said resin comprises 10% to 34% by weight of said mixture and said filler comprises 66% to 90% by weight of said mixture.

10. A method according to claim 1 wherein said mixture further comprises mica.

11. A method according to claim 10 wherein said mica comprises 0.1% to 1.0% by weight of said mixture.

12. A method according to claim 1 wherein said mixture further comprises one or more of carbon black, a UV stabilizer, a ductility enhancer and a fireproofing component.

13. A method according to claim 1 wherein said step of preparing said mixture comprises heating said filler and adding said resin to said filler.

14. A method according to claim 10 wherein said filler used to prepare said mixture is at a temperature of about 350 degrees F.

15. A method according to claim 1 wherein said temperature of step (b) is in the range of 300 to 325 degrees F.

16. A method according to claim 1 wherein said step of mixing is done in an open atmosphere.

17. A method according to claim 1 wherein said step of straining comprises passing said sheet between calendering rollers.

18. A method according to claim 17 wherein a calendering force applied by said calendering rollers is varied during the step of straining so as to cause a variation in color tone of said sheet.

19. A method according to claim 1 further comprising the step, after step (e), of applying a protective coating to said surface of said sheet.

20. A method according to claim 1, wherein the sheet produced in step (e) has a thickness of about one-quarter inch.

* * * * *